(12) United States Patent
Welchel et al.

(10) Patent No.: US 7,648,234 B2
(45) Date of Patent: Jan. 19, 2010

(54) EYEWEAR WITH HEATING ELEMENTS

(75) Inventors: Debra N. Welchel, Woodstock, GA (US); Megan Christine Hansen Smith, Roswell, GA (US); Herb Flores Velazquez, Neenah, WI (US); Matrice B. Jackson, Woodstock, GA (US); Russell J. Kroll, Atlanta, GA (US); Philip D. Palermo, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 346 days.

(21) Appl. No.: 11/413,575

(22) Filed: Apr. 28, 2006

(65) Prior Publication Data

US 2007/0252945 A1 Nov. 1, 2007

(51) Int. Cl.
*G02C 11/08* (2006.01)
(52) U.S. Cl. ....................................................... 351/62
(58) Field of Classification Search .................. 351/41, 351/158, 62
See application file for complete search history.

(56) References Cited

U.S. PATENT DOCUMENTS

| 182,013 | A | | 9/1876 | Andross |
| 1,026,272 | A | | 5/1912 | Leveque |
| 1,562,350 | A | | 11/1925 | Luckey |
| 3,160,735 | A | * | 12/1964 | Aufricht ........................ 2/435 |
| 3,377,626 | A | | 4/1968 | Smith |
| 4,209,234 | A | | 6/1980 | McCooeye |
| 4,250,577 | A | | 2/1981 | Smith |
| 4,638,728 | A | * | 1/1987 | Elenewski .................. 219/211 |
| 4,796,621 | A | | 1/1989 | Barle et al. |
| 4,799,782 | A | | 1/1989 | Tuttle |
| 4,863,257 | A | | 9/1989 | Morgan |
| 4,868,929 | A | | 9/1989 | Curcio |
| 4,937,880 | A | | 7/1990 | Beard |
| 4,942,626 | A | * | 7/1990 | Stern et al. .................... 2/161.7 |
| 4,942,629 | A | * | 7/1990 | Stadlmann ..................... 2/435 |
| 5,107,543 | A | | 4/1992 | Hansen |
| 5,162,823 | A | | 11/1992 | Goldstein |
| 5,191,364 | A | | 3/1993 | Kopfer |
| 5,319,397 | A | | 6/1994 | Ryden |
| 5,351,334 | A | * | 9/1994 | Chun et al. .................. 385/134 |
| 5,351,339 | A | * | 10/1994 | Reuber et al. ...................... 2/9 |

(Continued)

FOREIGN PATENT DOCUMENTS

DE 3323670 1/1985

(Continued)

OTHER PUBLICATIONS

Patent Abstracts of Japan, JP 2005215324, Publication Date: Aug. 11, 2005.

(Continued)

*Primary Examiner*—Scott J Sugarman
*Assistant Examiner*—Vipin M Patel
(74) *Attorney, Agent, or Firm*—Nathan P. Hendon; Sue C. Watson

(57) ABSTRACT

Eyewear having heating elements therewith which may be used for safety, sports, and the like. The eyewear may provide features which reduce or eliminate fogging and condensation on the eyewear when a heating element in the lens is activated. The eyewear also includes adjustable features to provide greater comfort.

16 Claims, 4 Drawing Sheets

U.S. PATENT DOCUMENTS

| | | | |
|---|---|---|---|
| 5,363,153 | A | 11/1994 | Bailiff |
| 5,363,512 | A | 11/1994 | Grabos, Jr. et al. |
| 5,416,536 | A | 5/1995 | Tee, Jr. |
| 5,457,505 | A | 10/1995 | Canavan et al. |
| 5,459,533 | A | 10/1995 | McCooeye et al. |
| 5,517,700 | A | 5/1996 | Hoffman |
| 5,584,078 | A | 12/1996 | Saboory |
| 5,610,669 | A | 3/1997 | Kuipers et al. |
| 5,652,637 | A | 7/1997 | Marini |
| 5,720,281 | A | 2/1998 | Allen et al. |
| 5,898,468 | A | 4/1999 | Mage |
| 5,907,385 | A | 5/1999 | Flores et al. |
| 5,956,117 | A | 9/1999 | Suh et al. |
| 5,956,119 | A | 9/1999 | Gibbs |
| 5,969,787 | A | 10/1999 | Hall et al. |
| 6,094,751 | A | 8/2000 | Parks |
| 6,318,369 | B1 | 11/2001 | Gregory |
| 6,637,038 | B1 | 10/2003 | Hussey |
| 6,701,537 | B1 * | 3/2004 | Stamp ............................ 2/424 |
| 6,783,235 | B1 | 8/2004 | Lin |
| 6,908,195 | B2 * | 6/2005 | Fuller ......................... 351/158 |
| 6,911,172 | B2 * | 6/2005 | Swab et al. ................. 351/158 |
| 6,959,988 | B1 | 11/2005 | Sheldon |
| 7,077,137 | B2 | 7/2006 | Russell |
| 2003/0035082 | A1 | 2/2003 | Olney |
| 2004/0066486 | A1 | 4/2004 | Yi |
| 2004/0069302 | A1 | 4/2004 | Wilson et al. |
| 2004/0100384 | A1 | 5/2004 | Chen et al. |
| 2004/0107483 | A1 | 6/2004 | Thorson |
| 2004/0125334 | A1 | 7/2004 | Olney |
| 2005/0012893 | A1 | 1/2005 | Yamamoto |
| 2005/0160521 | A1 | 7/2005 | Hussey |
| 2005/0174470 | A1 * | 8/2005 | Yamasaki ................... 348/345 |
| 2005/0237477 | A1 | 10/2005 | Lindahl |
| 2005/0270478 | A1 | 12/2005 | Curci et al. |
| 2005/0286734 | A1 | 12/2005 | Wang |
| 2006/0001827 | A1 | 1/2006 | Howell et al. |
| 2006/0197906 | A1 * | 9/2006 | Goodis ....................... 351/158 |

FOREIGN PATENT DOCUMENTS

| | | |
|---|---|---|
| GB | 264280 | 1/1927 |
| GB | 489530 | 7/1938 |
| GB | 2362472 | 11/2001 |
| WO | WO 97/04837 | 2/1997 |
| WO | WO 97/50013 | 12/1997 |
| WO | WO 98/39682 | 9/1998 |
| WO | WO 99/55180 | 11/1999 |
| WO | WO 02/02039 | 1/2002 |
| WO | WO 2004/098715 | 11/2004 |

OTHER PUBLICATIONS

Patent Abstracts of Japan, JP 2005269572, Publication Date Sep. 29, 2005.

* cited by examiner

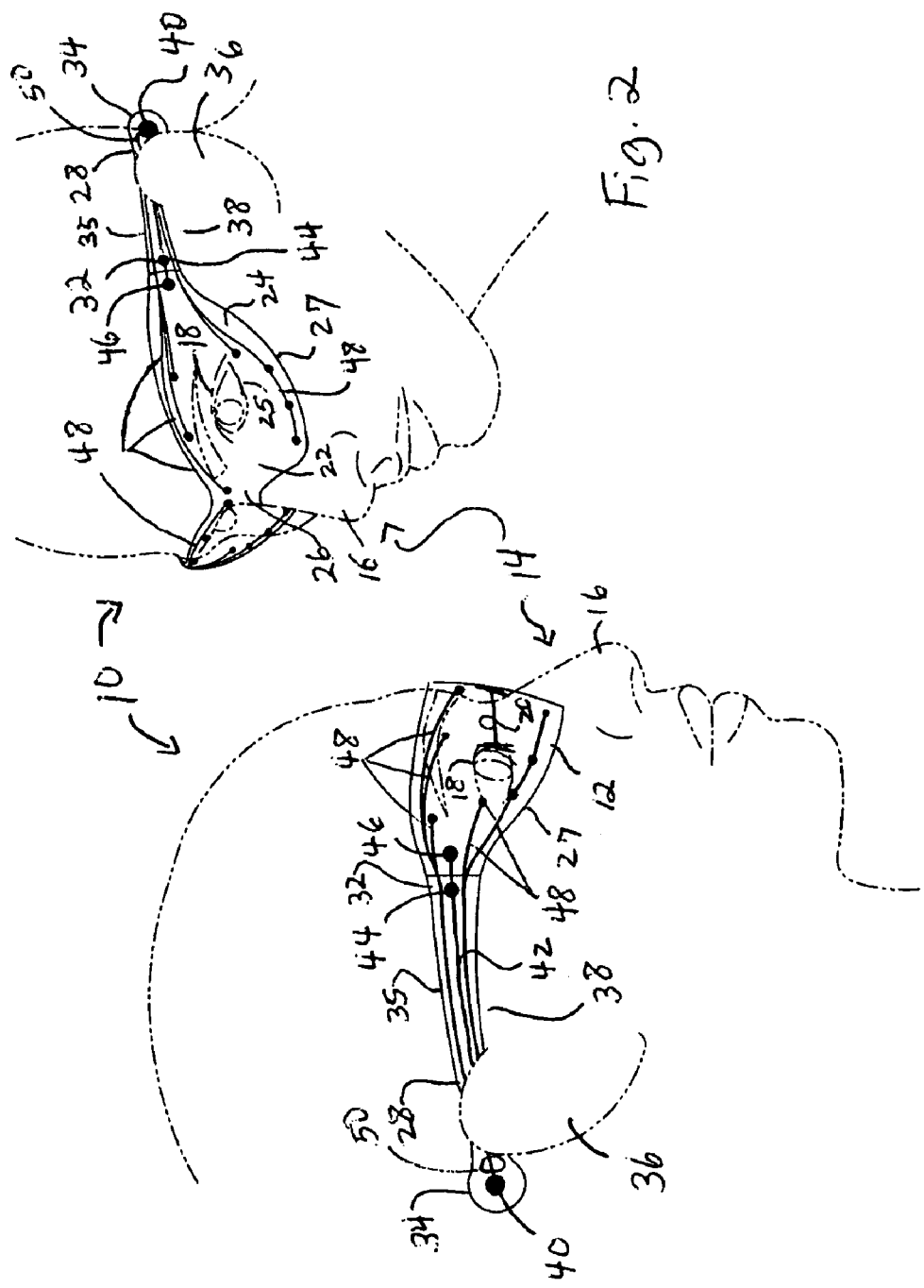

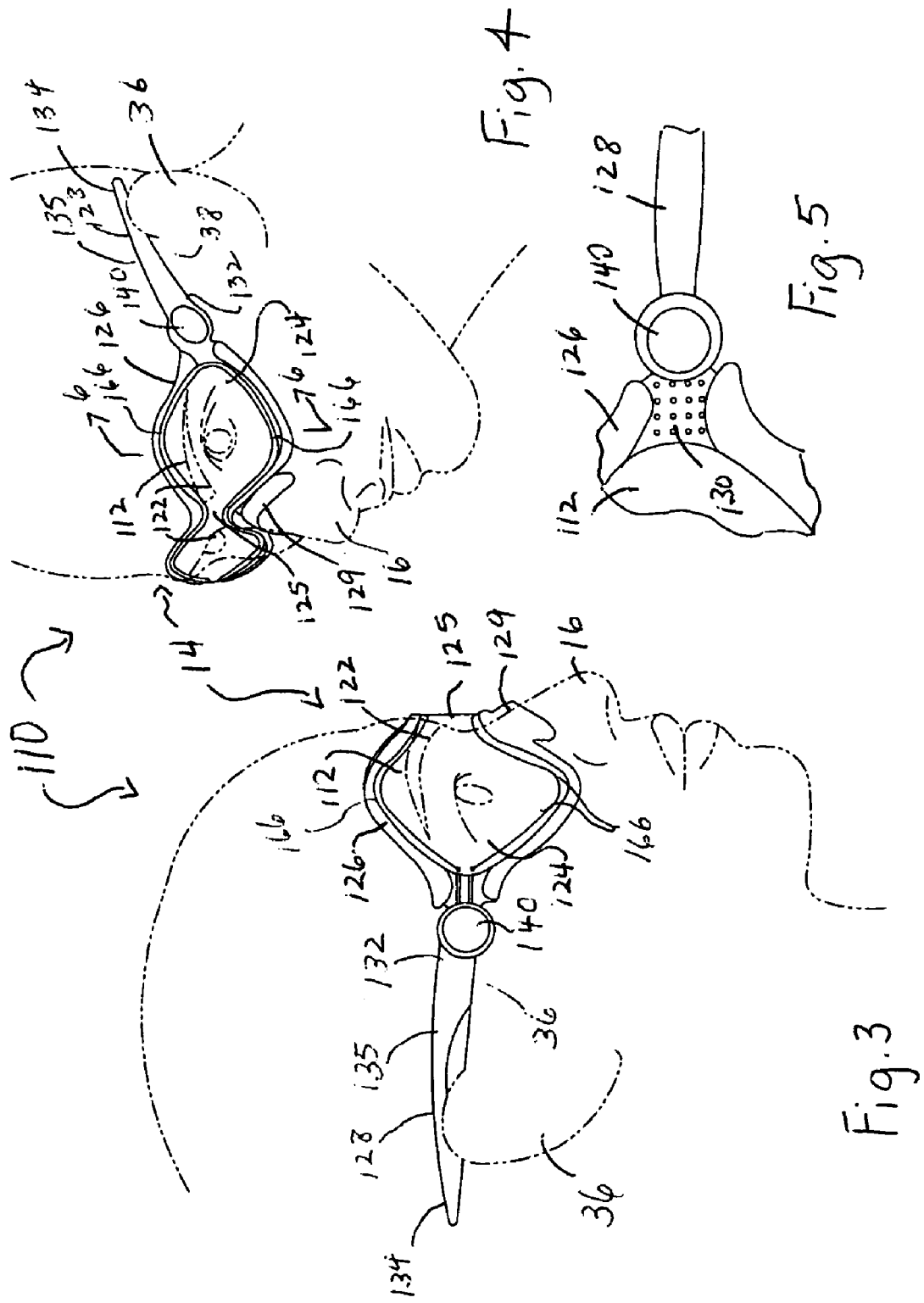

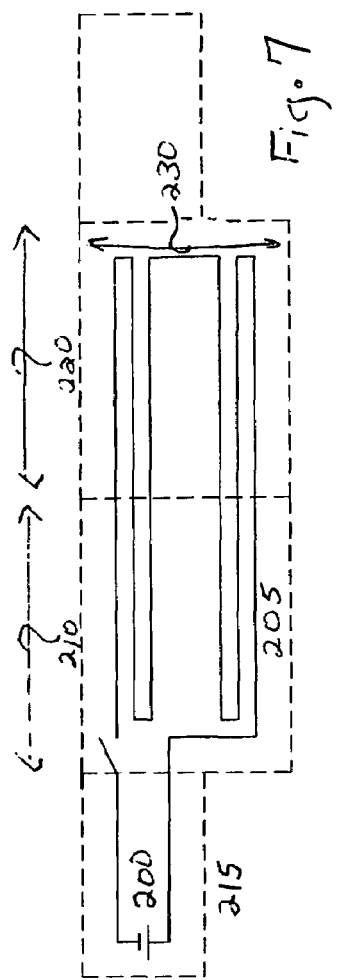
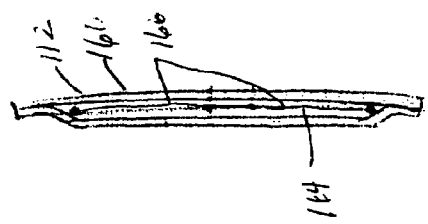
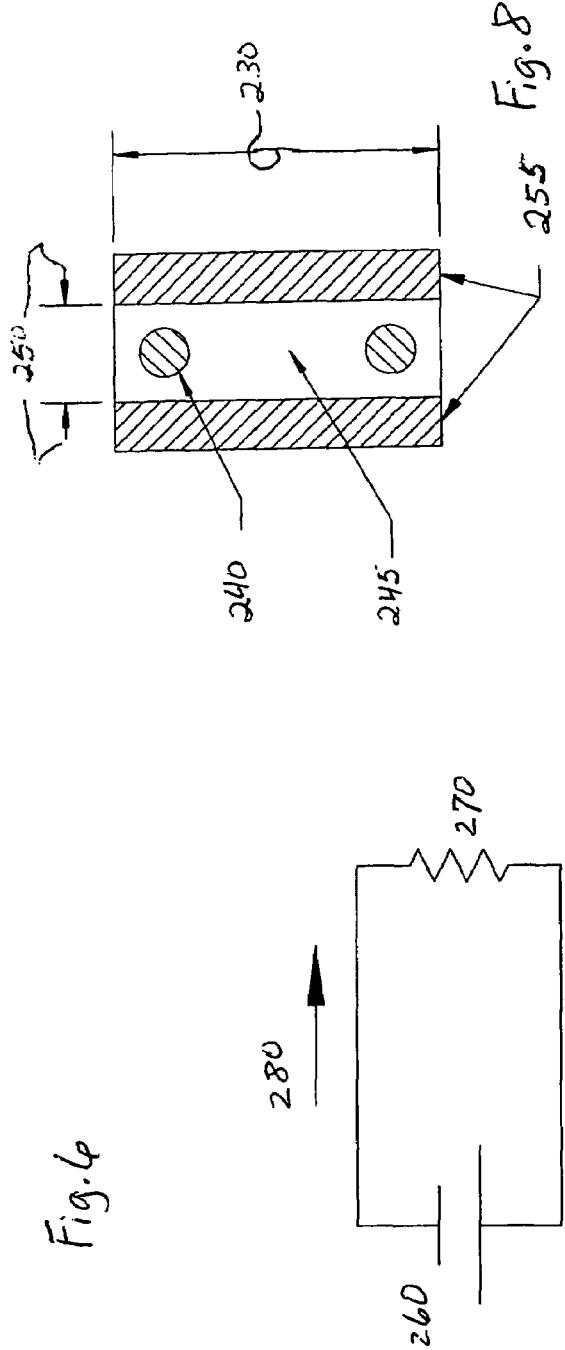

EYEWEAR WITH HEATING ELEMENTS

BACKGROUND OF THE INVENTION

This invention relates to eyewear, and especially eyewear used for safety and/or activities such as sports.

Eyewear for safety applications in industrial use and/or sports are used to protect a user's eyes. Such eyewear is usually designed to fit relatively closely to a user's face, so that noxious gas, liquid, particles, contaminants, and the like, do not touch or affect a user's eye(s).

Safety and some sports glasses or eyewear are often designed and formed such that they are bulky and heavy to wear. Some hinder vision when they fog under cool conditions which result in moisture condensation on the eyewear. This results in poor compliance in users donning and wearing the eye wear; the poor compliance occurs especially when the eyewear does not enhance a user's ability to see, but hinders it. Such occurrences increase the risk to a user in either an industrial or sporting use of the eyewear, rather than decreasing it.

Therefore, safety and/or sports eyewear which is lightweight and reduces or eliminates fogging and/or condensation by warming of the lenses is desirable. Such eyewear may provide warming to the lens and/or other portions of the eyewear via electrical current from a battery. The conductive elements may include wires, heating elements, such as thin film heating elements, and so forth. In addition, such eyewear may provide some design features which makes it more attractive to wear, also increasing compliance.

DEFINITIONS

As used herein, the term "glasses" or "eyewear" refers to eyeglasses, goggles, or other objects worn over the eyes.

As used herein, the terms "ear piece" or "ear pieces" refers to The portion of glasses or eyewear which extends from a lens and/or frame to extend over and/or about a portion of a user's ear to assist in holding the glasses or eyewear on a user's head.

As used herein, the phrase "custom fit" refers to an item that is provided or made in a proper size, shape and fit for the individual, particularly, to fit the contours of a certain area of an individual's body (For example, "These shoes were made to fit my feet very well.").

As used herein, the term "contour" refers to at least a portion of an item which is shaped to fit the outline or form of something (Example, "A contour sheet").

As used herein, the term "hinge" or "hinges" refers to a jointed or flexible device that connects and permits pivoting or turning of a part to a stationary component. Hinges include, but are not limited to, metal pivotable connectors, such as those used to fasten a door to frame, and living hinges. Living hinges may be constructed from plastic and formed integrally between two members. A living hinge permits pivotable movement of one member in relation to another connected member.

As used herein, the terms "contaminate", "contaminant" and/or "contamination" mean to make unclean or impure by contact. Such contact may be by liquid, solid and/or gas. For example, but not by way of limitation, mud that befouls shoes; noxious fumes that foul the air; bodily fluids that foul clean diapers.

As used herein, the term "fasteners" means devices that fasten, join, connect, secure, hold, or clamp components together. Fasteners include, but are not limited to, screws, nuts and bolts, rivets, snap-fits, tacks, nails, loop fasteners, and interlocking male/female connectors, such as fishhook connectors, a fish hook connector includes a male portion with a protrusion on its circumference. Inserting the male portion into the female portion substantially permanently locks the two portions together.

As used herein, the term "couple" includes, but is not limited to, joining, connecting, fastening, linking, or associating two things integrally or interstitially together.

As used herein, the term "configure" or "configuration" means to design, arrange, set up, or shape with a view to specific applications or uses. For example: a military vehicle that was configured for rough terrain; configured the computer by setting the system's parameters.

As used herein, the term "substantially" refers to something which is done to a great extent or degree; a significant or great amount; for example, as used herein "substantially" as applied to "substantially" covered means that a thing is at least 90% covered.

As used herein, the term "alignment" refers to the spatial property possessed by an arrangement or position of things in a straight line or in parallel lines.

As used herein, the terms "orientation" or "position" used interchangeably herein refer to the spatial property of a place where or way in which something is situated; for example, "the position of the hands on the clock."

As used herein, the term "about" refers to an amount that is plus or minus 10 percent of a stated or implied range.

As used herein, the term "resilient" and "resiliency" refers to the physical property of an object and/or a material that can return to its original shape or position after deformation that does not exceed its elastic limit.

These terms may be defined with additional language in the remaining portions of the specification.

SUMMARY OF THE INVENTION

The present invention is directed to eyewear for protecting a user's eyes. The eyewear includes at least one lens, a power source provided with the lens, and a pair of ear pieces hingeably coupled adjacent an outer edge of the lens. The lens includes at least one first portion positioned adjacent the user's nose and at least one second portion which is positioned adjacent an outer edge of the user's eye when the eyewear is positioned on the user's face. The lens is positioned to extend a distance from the user's eye and cover the user's eye from the distance. Additionally, the lens has an outer edge and at least one heating element positioned within the lens. The power source is releaseably coupled to the heating element to provide heat to the lens.

Additionally, the present invention is directed to eyewear that includes a pair of lenses, at least a portion of a frame positioned about at least a portion of an outer edge of the pair of lenses, and a pair of ear pieces coupled to the frame to assist in holding the eyewear on the user's head. The lenses are positioned adjacent each other and positioned together to provide a vacuum sealed space in between. Additionally, the lenses each have at least one first portion positioned adjacent the user's nose and at least one second portion which is positioned adjacent an outer edge of the user's eye when the eyewear is positioned on the user's face. The pair of lenses are positioned to extend a distance from the user's eye and cover the user's eyes from the distance. Finally, the lenses each have an outer edge and at least one heating element positioned in the vacuum sealed space between the lenses.

Finally, the present invention is also directed to eyewear that includes a pair of lenses, at least a portion of a frame positioned about at least a portion of an outer edge of the pair of lenses, and a pair of ear pieces coupled to the frame to assist in holding the eyewear on the user's head. The lenses are positioned adjacent each other and provide a vacuum sealed space in between the lenses. Each of lenses has at least one first portion positioned adjacent the user's nose and at least one second portion which is positioned adjacent an outer edge of the user's eye when the eyewear is positioned on the user's face. The pair of lenses are positioned to extend a distance from the user's eyes and cover the user's eyes from the distance. Finally, the pair of lenses create a microenvironment between the user's eyes such that fogging of the lenses is substantially eliminated.

BRIEF DESCRIPTION OF THE DRAWINGS

FIG. 1 is a side view of the eyewear of the present invention, showing a common lens extending across a user's eyes and heating elements extending through the lens material and eyewear and a battery coupled to at least one ear piece;

FIG. 2 is a perspective view of the eyewear of FIG. 1;

FIG. 3 is a side view of another embodiment of the eyewear of the present invention, showing a common lens extending across a user's eyes with heating elements positioned in a portion of the lens, a battery positioned adjacent the junction of the lens and ear piece;

FIG. 4 is a perspective view of the eyewear of FIG. 3;

FIG. 5 is a partial view of the eyewear of FIGS. 3 and 4, showing the battery positioned adjacent the lens and ear piece;

FIG. 6 is a cross section of FIG. 4 taken along lines 6-6, showing the double lens having a vacuum sealed space and heating elements positioned in the space;

FIG. 7 is a schematic diagram showing one-half of the eyewear with resistant wire heating elements positioned therein;

FIG. 8 is a cross sectional view of the lens showing the heating element wires embedded in the lens;

FIG. 9 is a heating circuit diagram; and

DETAILED DESCRIPTION

Figure 10:
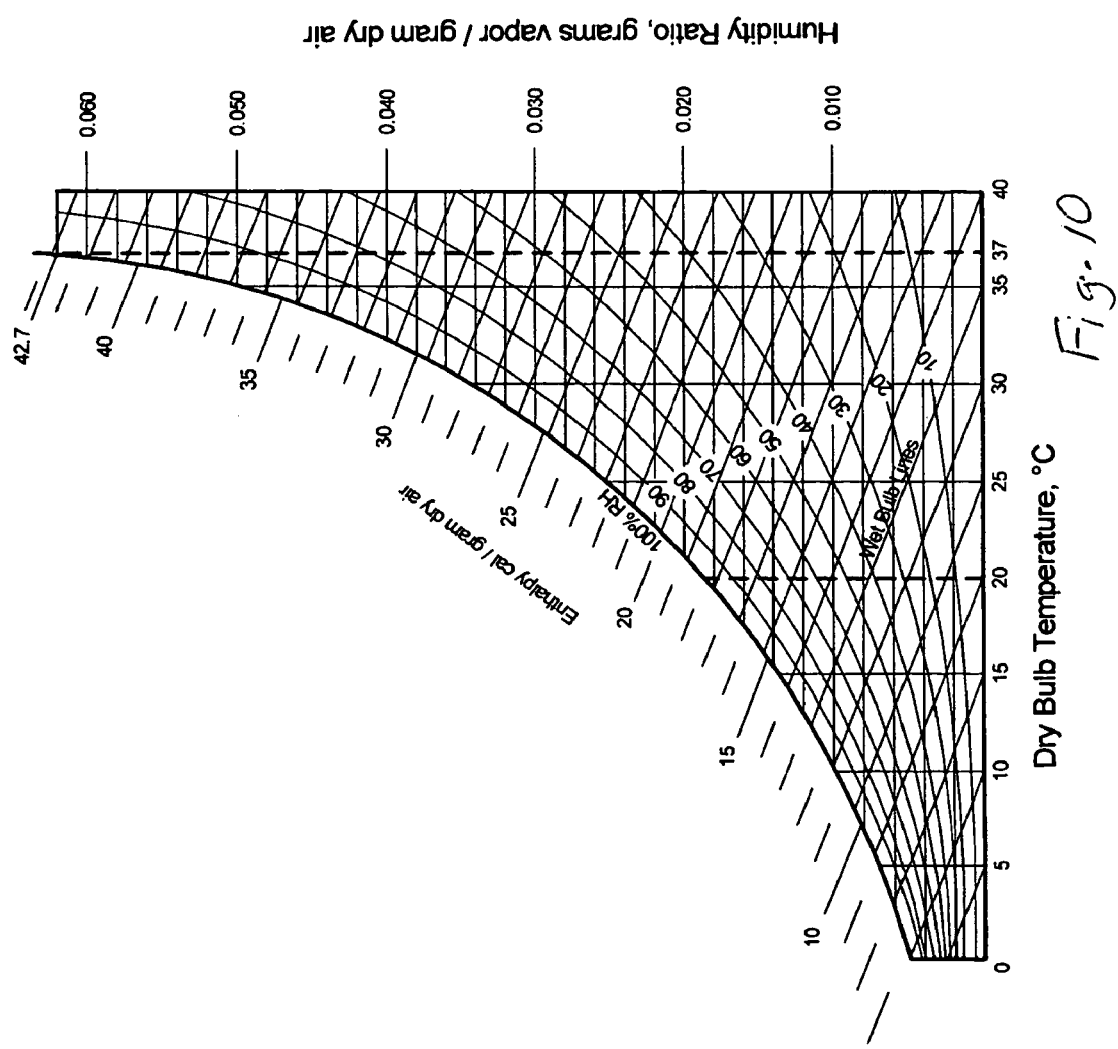
FIG. 10 is a psychrometric chart for water vapor in air at 1 atmosphere pressure.

Reference will now be made in detail to one or more embodiments of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

Safety glasses and/or glasses used in sports applications are usually made with shatter-resistant plastic lenses to protect the eye. Although safety lenses may be constructed from a variety of materials that vary in impact resistance, certain standards suggest that they maintain a minimum 1 millimeter thickness at the thinnest point, regardless of material. Safety glasses can vary in the level of protection that they provide based on their intended application. For example, those used in medicine may be expected to protect against blood splatter while safety glasses in a factory might have stronger lenses and a stronger frame and may include additional shields or safety features. The lenses of safety glasses may be shaped for correction or magnification. Some safety glasses may also be designed to fit over corrective glasses or sunglasses.

While face shields, goggles, and so forth are available as well, some studies have suggested that they will not always be used due to their bulkiness and weight. Therefore, lighter weight eyewear, while not providing as much protection as full face shields and/or goggles, may be preferred and actually worn more frequently by users due to their lack of size or bulk and their reduced weight. In addition, recent studies have also suggested that when safety glasses are both light weight and have a more stylish design, these features in combination also result in a higher usage of safety glasses in the appropriate situations.

The lenses of safety glasses are desirably made from plastic. There are a number of suitable plastics which may be utilized. Examples of some plastics used for eyewear include polycarbonates, such as LEXAN® manufactured by General Electric, Fairfield, Conn., allyl diglycol polycarbonate such as CR-39® manufactured by PPG Industries, Pittsburgh, Pa., and thermoplastic elastomers (TPE) such as Kraton® or Dynaflex® produced by GLS, McHenry, Ill.

Other materials may also be available for making lenses; other materials may be added to or provided via, for example, but not by way of limitation, a coating, cover, and so forth provided to the lenses to provide additional features. Such features may include, but are not limited to ultraviolet (UV) light protection, anti-fogging protection, anti-reflective (AR) protection, and so forth. Safety and/or sports glasses may desirably be ranked according to meeting certain requirements. In the United States, the American National Standards Institute (ANSI) has various standards and ratings for safety glasses. Safety glasses may be rated according to their ability to resist, for example, flying debris, heat, sparks, acid splash, abrasive blasting materials, glare, radiation, and so forth.

Safety and/or sports glasses may have numerous uses in a household situation. Safety glasses may be used while painting, while cutting grass, and so forth. Many different types of sports have found protective eyewear useful as well. Safety glasses or eyewear are increasingly needed for new industrial, home and sports applications.

In addition, eyewear which is heated is known but is designed generally only for use in extreme conditions, such as arctic-type conditions of moisture and cold. Eyewear used in these conditions is often bulky and requires a separate power source which must be carried separately and attached to the eyewear via a power cord-type attachment.

Heated eyewear which is used in less extreme conditions is desirably. Such eyewear would likely increase user comfort and decrease fogging, thereby resulting in greater compliance in use. Such eyewear would desirably be lightweight, portable, and have a self-contained power source. That is, the power source desirably would be releaseably coupled directly to the eyewear.

Referring now to FIGS. 1-10 in general, and 1-2 in particular, the present invention provides eyewear adapted to protect a user's eyes. In the present embodiment, the eyewear 10 includes at least one lens 12, as illustrated in FIGS. 1 and 2 and 7-10. The lens may include a single lens 12 which extends generally across a user's face 14 and specifically across a user's nose 16 to cover both eyes 18 and thereby to provide protection to both eyes 18. Alternative, the eyewear 10 my include a pair of lenses (not shown).

Desirably the lens 12 extends a distance from the user's eyes and is configured to cover or extend over each of a user' eyes 18 from the distance 20 to provide protection thereto, providing a microenvironment in the space between a user's eye and the lens 12. The lens 12 desirably includes at least one, and in this embodiment a pair of first portions 22 which are positioned adjacent a user's nose 16. The lens 12 desirably also includes a pair of second portions 24 which are positioned adjacent an outer edge 25 of a user's eye 18. The lens 12 includes a connector 26 which is positioned across a user's nose 16. The lens 12 may include a frame positioned about at least a portion of an outer edge 27 of the lens 12 (not shown). In the present embodiment, however, the material which provides the lens 12 provides the entire eyewear 10. This material may include, but not by way of limitation, polycarbonate.

A pair of ear pieces 28 are desirably coupled to the lens 12 on or near the outer edge 27 and near the second portions 24 of the lens 12. Each ear piece 28 is configured to hold the lens 12 adjacent a user's face 14. Desirably, each ear piece 28 includes a first end 32 and a second end 34. A temple piece 35 desirably extends between the first end 32 and the second end 34.

The first end 32 of each ear piece 28 is desirably pivotably coupled adjacent an outer edge 27 and near the second portions 24 of the lens 12. The second end 34 desirably is positioned over and/or around a portion of a user's ear 36 when the eyewear 10 is being worn. Similarly, the temple piece 35 is desirably configured to be positioned adjacent a user's temple 38.

A power source or battery 40 is desirably coupled to at least one of the pair of ear pieces 28 adjacent the second end 34. The battery 40 desirably releasably couples to at least one contact wire 42 which run therefrom to a first contact 44 at the first end 32 of the ear piece. A second contact 46 is positioned on an outer edge 27 of the lens 12 adjacent the ear piece 28. When the ear pieces 28 of the eyewear 10 are unfolded and extended so that the eyewear 10 may be donned by a user, the first contact 42 on the first end 32 of the ear piece 28 is positioned in contact with or coupled to the second contact 44 on the outer edge 27 of the lens 12, and a circuit is created which provides a signal to the battery 40 to turn on and send a circuit through a plurality of heating elements or wires 48 positioned within the lens 12 of the eyewear 10.

The battery 40 may instead or in addition to be provided with an on/off switch (not shown). Further, the eyewear 10 may be provided with an attached control circuit or thermostat switch 50 to regulate the heat of the eyewear 10. Desirably, the battery 40 is rechargeable. Power sources include a standard battery, solar power/charged battery, and kinetic energy generated by body movement and transmitted to a power source. Such a thermostat switch 50 may be preset to prevent overheating, such that the temperature of the lens 112 never exceeds a certain desired preset temperature or temperature range.

In another embodiment of the invention, the eyewear 110 shown in FIGS. 3-6 is similar to the eyewear 10 shown in FIGS. 1-2 and referred to in the Example in FIGS. 7-10 and described in detail previously herein, except that the eyewear 110 has features which differ from those of eyewear 10. In the present embodiment, the eyewear 110 includes at least one lens 112, as shown in FIGS. 3-6. The lens may include a single lens 112 which extends generally across a user's face 14 and specifically across a user's nose 16 to cover both eyes 18 and thereby to provide protection to both eyes 18. Alternative, the eyewear 110 my include a pair of lenses (not shown).

Desirably the lens 112 extends a distance from the user's eyes and is configured to cover or extend over each of a user' eyes 18 from the distance 120 to provide protection thereto, providing a microenvironment in the space between a user's eye and the lens 112. The lens 112 desirably includes at least one, and in this embodiment a pair of first portions 122 which are positioned adjacent a user's nose 16. The lens 112 desirably also includes a pair of second portions 124 which are positioned adjacent an outer edge 25 of a user's eye 18. The lens 112 includes a connector 125 which is positioned across a user's nose 16. The lens 112 may include a frame 126 positioned about a substantial portion of an outer edge 127 of the lens 112. A nose piece 129 may be coupled to the connector 126 and provide some moveability, flexibility and/or comfort for a user's nose 16.

A pair of ear pieces 128 are desirably coupled to a flexible hinge 130 positioned on or near the outer edge 127 of the lens 112 and near the second portions 124 of the lens 112. Each ear piece 128 is configured to hold the lens 112 adjacent a user's face 14. Desirably, each ear piece 128 includes a first end 132 and a second end 134. A temple piece 135 desirably extends between the first end 132 and the second end 134.

The first end 132 of each ear piece 128 is desirably pivotably coupled adjacent a portion of the flexible hinge 130. The second end 134 desirably is positioned over and/or around a portion of a user's ear 36 when the eyewear 110 is being worn. Similarly, the temple piece 135 is desirably configured to be positioned adjacent a user's temple 38.

A battery 140 is desirably coupled to at least one of the pair of ear pieces 28, in this embodiment, but not by way of limitation, adjacent the flexible hinge 130. Desirably, the eyewear 110 includes contacts between the first end 132 and the lens 112 or frame 126 of the eyewear 110 which permits the battery 140 to be activated, in the same manner previously shown and described in detail herein.

The lens 112 in the present embodiment includes a first panel 160 and a second panel 162 formed to include a space 164 positioned therebetween. The first panel 160 and the second panel 162 of the lens 112 are sealed together via a vacuum seal (FIG. 6). Desirably, wires 166 and/or heating elements are positioned in the space 164, desirably around the edges of the lens 112 so not to impair a user's vision.

When the battery 140 is activated via moving the ear pieces 128 into a position such that the eyewear 110 may be donned, or by activity a switch, or any other known means, the wires and/or heating elements 166 desirably are activated and the eyewear 110 desirably warms to reduce fogging and condensation on the lens 112. It will be appreciated that the eyewear 10 and 110 may utilize any component or feature shown and/or described herein.

Alternatively, the same eyewear 110 having the same lenses 112 may be used, but without heating elements. In this embodiment, the double-paned lenses act much like double-paned windows to insulate the microenvironment created in the distance 120 between the eyes 18 and the lenses 112, thereby resulting in a reduction in fogging.

EXAMPLE

De-fogging safety glasses using heat from a small battery (as described herein and shown in FIGS. 1-2):

Battery: standard hearing aide battery number AC675 (E=1.4V, Capacity=635 mAh), Minimum Operating Time Required: 24 hours.

Specifications: power drawn from battery: 0.037 W; current draw from battery: 0.026 A; wire resistance: 54Ω; wire length: 1080 mm; wire gauge: nichrome 33 AWG, metric 1.8; lens material: polycarbonate; lens material thermal conductivity: 0.26 W/m–K; lens material minimum thickness around heat wires: 3.3 mm.

Time to Un-Fog Lens, Extreme Case Scenario:

A worker is in a room at 40° C. with 100% RH when suddenly he is surrounded by a cloud of saturated air at 37° C.

and 100% RH. How much energy is needed in order to heat the saturated air around the lens to un-fog the safety glasses.

Consider a sudden change in environment around safety glasses where:

$T_{room}$=20° C.@70% Relative Humidity;

Suddenly changes to:

$T_{room}$=37° C.@100% Relative Humidity

The energy required to evaporate water from around the lenses is taken from the psychometric chart in FIG. 10.

Enthalpy change in moving from 20° C. @ 70% RH, to 37° C. @ 100% RH is shown to be about □c=28 cal/g dry air.

Using FIGS. 7 and 8 as a guide, where for FIG. 7 200 is E=1.4 V; 215 is the battery, 210 and 220 are each 80 mm; 230 is 60 mm and 205 is R=53 ohm; and for FIG. 8, 250 is 3.3 mm thickness of the polycarbonate; 230 is 60 mm; 240 is nichrome wire, and 245 is the polycarbonate lens, the volume of air displaced by the safety glass lenses is about:

Volume Lenses=(160×60×3.3)=31,680 mm³.

Mass of dry air displaced by lenses:

$$M_{air} = \frac{1.25 \text{ g, dry air}}{\text{liter}} \cdot \left(\frac{1 \text{liter}}{0.001 \text{ m}^3}\right) \cdot \left(\frac{1 \text{ m}}{1000 \text{ mm}}\right)^3 \cdot$$

31,680 mm³ = 0.0396 g, dry air

The energy required to evaporate the water:

$$\Delta q = 28 \frac{\text{cal}}{\text{g, dry air}} \cdot (0.0396 \text{ g, dry air}) \cdot$$

$$\left(1 \frac{\text{watt-sec}}{0.239 \text{ cal}}\right) = 4.64 \text{ watt-sec}$$

Only the heat energy leaving through the surface of the lens is effective in removing the fog. Percent heat energy lost is proportional to surface area of lens edges versus the total surface area of the glasses.

$$\% \text{ Heat Loss} = \frac{2 \cdot (160 + 60) \cdot 3.3}{2 \cdot (160 \cdot 60) + 2 \cdot (160 + 60) \cdot 3.3}$$

$$= \frac{1452}{20,652} = 7\% \text{ heat loss}$$

Total battery energy required to un-fog safety glasses under the stated conditions: Δq=4.64*1.07=5.0 watt–sec Battery Specifications: Battery Model Number: AC675; $I_{capacity}$=635 mAh; E=1.4V Maximum current draw for 24 hours continuous duty:

$$i = \frac{I_{capacity}}{t} = \frac{0.635 \text{ A hour}}{24 \text{ hour}} = \underline{0.026 \text{ A}}$$

Maximum power output: P=i·E=0.026·(1.4)=0.037 W

Time required to un-fog lenses:

$$t = \frac{4.64 \text{ watt-sec}}{0.037}$$

= 125 seconds to un-fog lenses under stated conditions

Referring to FIG. 9, where 260 is V=1.4, where 280 is i, and where 270 is R:

Wire resistance:

$$R = \frac{E}{i} = \frac{1.4 \text{ V}}{0.026 \text{ A}} = \underline{54\Omega}$$

Wire temperature required to maintain lens surface at 37° C. is determined.

Wires are embedded inside the polycarbonate. Heat passes through polycarbonate by conduction. Assuming entire lens area is active in conducting heat:

$$\Delta T = \dot{q} \cdot \frac{l}{k \cdot A}$$

$$= 0.037 \text{ W} \cdot \left(\frac{\text{m} - K}{0.26 \text{ W}}\right) \cdot \frac{0.0015 \text{ m}}{2 \cdot (0.08 \cdot 0.06) \text{ m}^2}$$

$$= 0.22° \text{ C.}$$

Wire will be less than 1° C. above temperature of lens surface.

Wire size determined using the law of conductivity. Wire length, diameter, and metal type will determine the wire's resistance. Wire area, assuming a wire length of 1080 mm as shown in FIG. 1 is:

$$A = \frac{\rho \cdot L}{R} = 1.12 \times 10^{-3} (\Omega - \text{mm}) \frac{(2 \cdot 6 \cdot 80 + 2 \cdot 60) \text{ mm}}{53\Omega}$$

$$= \underline{0.023 \text{ mm}^2}$$

Wire Diameter:

$$\phi = \sqrt{\frac{4 \cdot A}{\pi}}$$

$$= \sqrt{\frac{4 \cdot (0.023)}{\pi}}$$

$$= \underline{0.17 \text{ mm } (0.007'' \phi) 33 AWG \text{ or metric } 1.8}$$

Surface Temperature Considerations:

$$P = h \cdot A \cdot (T_{surface} - T_{air})$$

where: $h$ = convection heat transfer coefficient $A$ = lens surface area

-continued $$T_{surface} = T_{air} + \frac{P}{h \cdot A}$$

$$T_{wire} = \frac{P \cdot l}{k \cdot A} + T_{surface}$$

where: $k$ = thermal conductivity $l$ = length of thermal conductive path

Heat transfer considerations may be considered; the convection heat transfer coefficient from the lens surface to the air depends upon the amount of moisture in the air and the amount of air movement.

It will be appreciated that the foregoing example, given for the purposes of illustration, is not to be construed as limiting the scope of this invention, which is defined by the following claims and all equivalents thereto.

It will be appreciated that the features and/or components of one embodiment may be combined, in whole or in part, with another embodiment. In some circumstances, such combination may yield yet another embodiment.

While the present invention has been described in connection with certain preferred embodiments, it is to be understood that the subject matter encompassed by way of the present invention is not to be limited to those specific embodiments. On the contrary, it will be appreciated that some elements and/or articles may be used with other elements or articles. It is intended for the subject matter of the invention to include all alternatives, modifications and equivalents as can be included within the spirit and scope of the invention.

What is claimed is:

1. Eyewear adapted to protect a user's eyes, the eyewear comprising:
    a pair of lenses, the lenses positioned adjacent each other and the lenses positioned together to provide a vacuum sealed space provided between each other, the lenses each having at least one first portion positioned adjacent a user's nose and at least one second portion which is positioned adjacent an outer edge of a user's eye when the eyewear is positioned on a user's face, the pair of lenses positioned to extend a distance from a user's eye and the pair of lenses configured to cover a user's eye from the distance, the pair of lenses each having an outer edge, the pair of lenses having at least one heating element positioned in the vacuum sealed space between the lenses;
    at least a portion of a frame positioned about at least a portion of an outer edge of the pair of lenses; and
    a pair of ear pieces coupled to the frame, the ear pieces configured to assist in holding the eyewear on a user's head, wherein at least one of the pair of ear pieces comprising a contact point and the lens adjacent the ear piece includes another contact point such that when a contact on the ear piece is positioned against a contact point on the lens, the battery is activated and the heating elements in at least the lens are activated, and
    wherein the battery is not activated to heat the eyewear until at least one ear piece having a battery thereon is unfolded and extended at a perpendicular angle away from the lens such that a contact point on one ear piece contacts a contact point on the lens such that a circuit is completed to turn the battery on to activate the heating elements.

2. The eyewear of claim 1, wherein at least one of the lenses includes a heating elements positioned adjacent thereto.

3. The eyewear of claim 2, wherein the heating element is a wire.

4. The eyewear of claim 2, wherein the lens comprises polycarbonate.

5. The eyewear of claim 1, wherein the power source is a battery which is removable and replaceable.

6. The eyewear of claim 5, wherein a control circuit is positioned adjacent the battery.

7. The eyewear of claim 6, wherein current is conducted from the battery to the heating element when the lens is activated, and wherein the control circuit regulates the amount of heating.

8. The eyewear of claim 7, wherein the heating element is a thin film heating element.

9. Eyewear adapted to protect a user's eyes, the eyewear comprising:
    a pair of lenses, the lenses positioned adjacent each other and the lenses positioned together to provide a vacuum sealed space provided between each other, the lenses each having at least one first portion positioned adjacent a user's nose and at least one second portion which is positioned adjacent an outer edge of a user's eye when the eyewear is positioned on a user's face, the pair of lenses positioned to extend a distance from a user's eye and the pair of lenses configured to cover a user's eye from the distance, the pair of lenses each having an outer edge, the pair of lenses having at least one heating element positioned in the vacuum sealed space between the lenses;
    at least a portion of a frame positioned about at least a portion of an outer edge of the pair of lenses; and
    a pair of ear pieces coupled to the frame, the ear pieces configured to assist in holding the eyewear on a user's head.

10. The eyewear of claim 9, wherein the at least one lens includes heating elements embedded therein.

11. The eyewear of claim 10, wherein the heating element is a wire.

12. The eyewear of claim 10, wherein the lens comprises polycarbonate.

13. The eyewear of claim 9, further comprising a power source is a battery which is removable and replaceable.

14. The eyewear of claim 13, further comprising a control circuit positioned adjacent the battery.

15. The eyewear of claim 14, further comprising current is conducted from the battery to the heating element when the lens is activated, and wherein the control circuit regulates the amount of heating.

16. The eyewear of claim 15, wherein the heating element is a thin film heating element.

* * * * *

UNITED STATES PATENT AND TRADEMARK OFFICE
CERTIFICATE OF CORRECTION

PATENT NO. : 7,648,234 B2  Page 1 of 1
APPLICATION NO. : 11/413575
DATED : January 19, 2010
INVENTOR(S) : Welchel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Sixteenth Day of November, 2010

David J. Kappos
*Director of the United States Patent and Trademark Office*